UNITED STATES PATENT OFFICE.

ERNEST E. SCHMIDT, OF BLANTON, FLORIDA.

INK.

1,420,289. Specification of Letters Patent. Patented June 20, 1922.

No Drawing. Application filed December 2, 1921. Serial No. 519,401.

*To all whom it may concern:*

Be it known that I, ERNEST E. SCHMIDT, a citizen of the United States, residing at Blanton, in the county of Pasco and State of Florida, have invented certain new and useful Improvements in Inks, of which the following is a specification.

This invention relates more particularly to improvements in laundry, marking and printing inks, but is also adapted for use in writing checks, drafts, notes and all other valuable documents.

The objects of my invention are to provide an ink of a clear, black color which is indelible, waterproof, chemical proof and indestructible which when applied does not spread and which is non-injurious to linen, cotton, wool or any other fabric. It has other objects and advantages which will be hereinafter set forth.

The invention consists in the composition of matter and in the process of making same as herein set forth.

I prefer to employ the following ingredients:

One and one-half (1½) ounces of best grade of spirit of soluble black; otherwise known as nigrosine the chemical formula of which is unknown and is an X quantity. It is considered a mixture of various indulines and similar bases in combination. It is made by heating nitro benzol with aniline hydrochloride with suitable elements, such as iron, etc.

Two (2) ounces of oil of mirbane;

One and one-half (1½) ounces of carbolic acid crystals;

Five (5) drops of Turkey red oil, sometimes called soluble oil or sulfonated castor-oil the chemical formula of which is

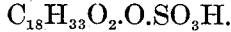

$$C_{18}H_{33}O_2.O.SO_3H.$$

The chemicals are mixed substantially as follows: First dissolve the spirit of soluble black in the oil of mirbane, then mix the carbolic acid with the sulfonated castor-oil, then mix all together, then bring the entire mixture to a boil and let it boil for two or three minutes, then let it cool and then bottle. It is then ready for use.

The carbolic acid when added to the mixture blackens the color. It fixes the pigment on cloth and all other materials making it indelible, waterproof, chemical proof and indestructible. It withstands the strongest bleaches known to science, such as chloride of lime, acetic acid, oxalic acid, ammonia, caustic lye and soda, the strongest soap, etc., all of which are used in laundry work and are boiled for one hour. My ink withstands all these and cannot be removed with any chemicals, acids or alkalis or any combination of chemicals. It is better, blacker, more durable and cheaper than any other ink. One marking will last until the fabric is worn out. My ink does not evaporate, because it contains no water or any other volatile substance as all other inks do. Mine contains nothing but oil, and consequently it does not evaporate. It contains no gum, glue or glycerine as others do. Other inks rust pens in 24 to 28 hours but my ink contains no acids and, therefore, cannot rust pens. The carbolic acid assists in dissolving the pigment and keeps it in perfect solution. All carbolic acid contains more or less water and I use the sulfonated castor-oil because this oil mixes perfectly with water. It combines with the small portion of water in the acid and forms an emulsion. Oil and water do not mix, but this does mix. All other inks spread or creep but the water soluble oil in my ink has an important function which prevents the ink from creeping or spreading on the fabric, whereas gum or glue is used in other inks to prevent creeping or spreading and when the fabric is put into water the glue is dissolved and most of the ink is washed out. My ink contains no glue and every particle of the ink at once sinks into the fabric and stays there. This water soluble oil enables one to make 135 characters on cloth while only 25 can be made with any other ink with one dip of the pen. The reason they cannot make more is because their ink contains gum, glue and glycerine. These substances stick so tight to the pen point that it will not flow. All other inks contain turpentine, gasoline, alcohol, benzine, kerosene or other volatile substances. Consequently their inks evaporate rapidly, become gummy and sticky and will not flow, and over one-half is lost by evaporation. My ink contains only oil, does not evaporate and there is no loss. It can be left in an open vessel for thirty days and there will be no loss or deterioration whatsoever. Other inks become worthless in several hours exposure to the air. Mine is the quickest drying ink upon the market. Every particle at once soaks into the fabric. It can be put into the wash at once and cannot be removed from the goods. The oil of mirbane is used because it is the thinnest oil on the market. Consequently it will dissolve more dye stuff, producing a blacker and more durable ink. This oil eliminates volatile substances with all their objections. The oil further has a very pleasant and agreeable odor, whereas other inks have the odor of creosote which is very disagreeable and objectionable. It is the best, most economical, easiest writing or marking ink on the market. It is blackest in color, lasts longest with one marking and is the cheapest ink to buy. Further it is a perfect printing ink. No two different kinds of ink are necessary as this is a two-in-one-ink. It is well adapted for printing, writing, or marking.

If the chemicals are not mixed as above specified the results will not be satisfactory. The ink makes a perfect solution, will not settle or precipitate, will not evaporate, become gummy or sticky, and does not have to be shaken before use.

The proportions may be varied without departure from my invention and I do not restrict myself to the above formula but desire to use more or less of the chemicals according to the required circumstances.

My ink is also a perfect chemical proof ink for writing checks, drafts, notes and all other valuable documents. It sinks deeply into the pores of the paper, coming through on the opposite side. It cannot, therefore, be rubbed or scratched out as all other writing can. This one factor alone saves millions of dollars in fraudulently raised checks, etc. No chemicals known to science will remove this ink from paper. It is also a perfect ink for printing purposes. Furthermore, on account of its quick penetrating and waterproof qualities the ink could be used as a paint, etc. When used as a check or printing ink it does not creep or spread on paper, cloth, wood or any other substances. The ingredients used and the methods of mixing them prevent that and overcomes one of the greatest objections in all other inks, namely: creeping and spreading. My ink is preferably strained before being bottled in order to remove all foreign substances and impurities.

Having described my composition and the process of making same as well as its objects, uses and advantages, what I claim as new and desire to secure by Letters Patent is:

1. The herein described composition adapted to form an ink, comprising spirit of soluble black, oil of mirbane, carbolic acid crystals and Turkey red oil, substantially as set forth and for the purposes specified.

2. The herein described composition adapted to form an ink, comprising about one and one-half ounces of spirit of soluble black, two ounces of oil of mirbane, one and one-half ounces of carbolic acid crystals and five drops of Turkey red oil, substantially as set forth and for the purposes specified.

3. The herein described composition, comprising one and one-half ounces of spirit of soluble black, two ounces of oil of mirbane, one and one-half ounces of carbolic acid crystals and a smaller proportion of Turkey red oil, substantially as set forth and for the purposes specified.

4. The herein described composition, comprising one and one-half ounces of spirit of soluble black, a larger proportion of oil of mirbane, one and one-half ounces of carbolic acid crystals, and a smaller proportion of Turkey red oil, substantially as set forth and for the purposes specified.

5. The herein described process which consists in first dissolving spirit of soluble black in oil of mirbane, then mixing the carbolic acid with the sulfonated castor-oil or Turkey red oil, then combining these two mixtures, then boiling the entire mixture for two or three minutes and then cooling the mixture, substantially as set forth and for the purposes specified.

6. The herein described process which consists in first dissolving the spirit of soluble black in the oil of mirbane, then mixing carbolic acid with sulfonated castor-oil then mixing these two mixtures together, then bringing the entire mixture to a boil, then boiling for two or three minutes, then letting it cool, then straining and then bottling ready for use, substantially as set forth and for the purposes specified.

ERNEST E. SCHMIDT.

Witnesses:
 JOSEPH H. RABB,
 J. S. BURKS.